(12) United States Patent
Nicholls

(10) Patent No.: US 9,809,242 B2
(45) Date of Patent: Nov. 7, 2017

(54) SYNTHETIC TURF STORAGE AND HANDLING SYSTEM

(71) Applicant: Mark H. Nicholls, Welland (CA)

(72) Inventor: Mark H. Nicholls, Welland (CA)

(*) Notice: Subject to any disclaimer, the term of this patent is extended or adjusted under 35 U.S.C. 154(b) by 0 days.

(21) Appl. No.: 15/251,650

(22) Filed: Aug. 30, 2016

(65) Prior Publication Data

US 2017/0057532 A1    Mar. 2, 2017

Related U.S. Application Data

(60) Provisional application No. 62/212,323, filed on Aug. 31, 2015.

(51) Int. Cl.
*B62B 3/10* (2006.01)
*B62B 3/00* (2006.01)

(52) U.S. Cl.
CPC .............. *B62B 3/104* (2013.01); *B62B 3/008* (2013.01)

(58) Field of Classification Search
CPC .. B62B 3/104; B62B 3/04; B62B 3/02; B62B 5/0069; B62B 5/0053; B62B 3/008
USPC ........................................................ 211/85.5
See application file for complete search history.

(56) References Cited

U.S. PATENT DOCUMENTS

| | | | | |
|---|---|---|---|---|
| 2,027,265 A | * | 1/1936 | Black | B62B 3/104 280/79.6 |
| 3,931,899 A | * | 1/1976 | McAlhaney | A01D 85/005 414/343 |
| 5,165,843 A | * | 11/1992 | Hendriks | B66F 9/12 172/19 |
| 2003/0218308 A1 | * | 11/2003 | Lamson | B62B 3/002 280/79.3 |
| 2007/0090618 A1 | * | 4/2007 | Dube | B62B 3/104 280/47.371 |
| 2007/0267371 A1 | * | 11/2007 | Farley | A47B 47/0083 211/85.18 |
| 2008/0088103 A1 | * | 4/2008 | Sloat | B62B 3/104 280/79.5 |
| 2012/0006930 A1 | * | 1/2012 | Mitchell | E01C 13/08 242/539 |

* cited by examiner

*Primary Examiner* — Korie H Chan
(74) *Attorney, Agent, or Firm* — Harter Secrest & Emery LLP

(57) ABSTRACT

A cart for use with rolls of synthetic turf comprising a first and second spaced apart longitudinal members; first and second lateral members between the first and second longitudinal members, the lateral members having at least one hitch ball disposed thereon; a plurality of lateral members between the first and second longitudinal members with one or more having an opening sized to receive a fork on a forklift and a hitch ball disposed thereon; first, second, third and fourth swivel casters having at least one wheel and disposed inside a perimeter defined by the first and second longitudinal members and the first and second lateral member; and a support member having at least one curved surface to from a cradle for receiving the one or more rolls of synthetic turf.

8 Claims, 4 Drawing Sheets

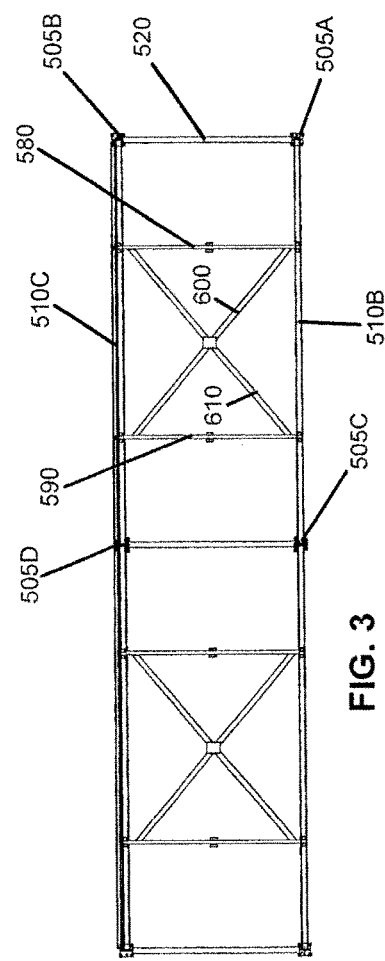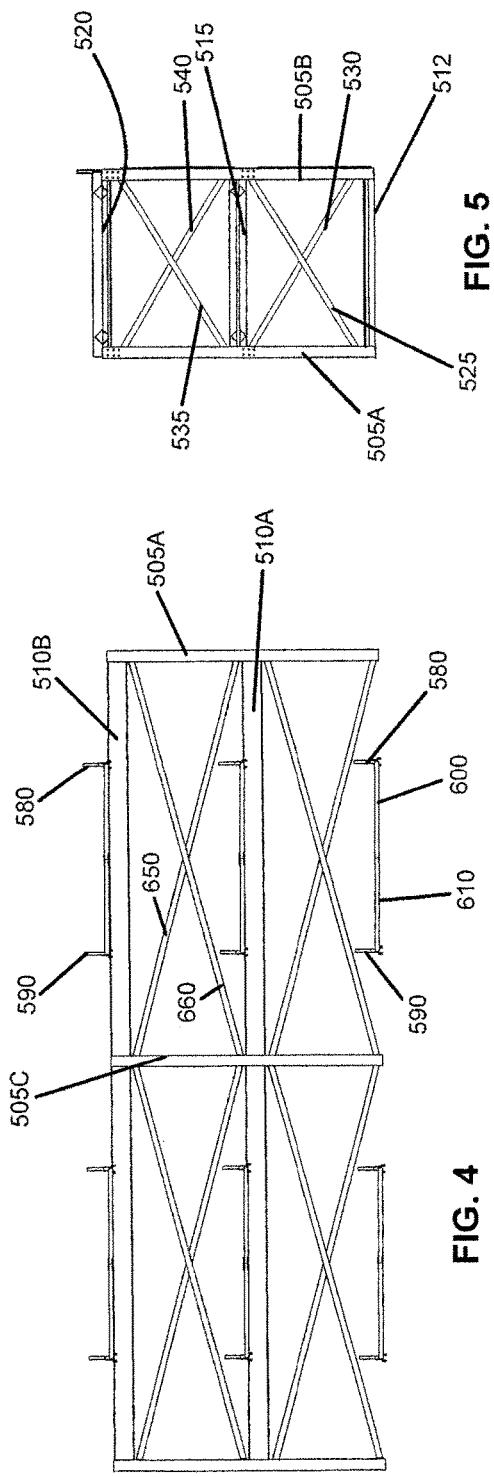

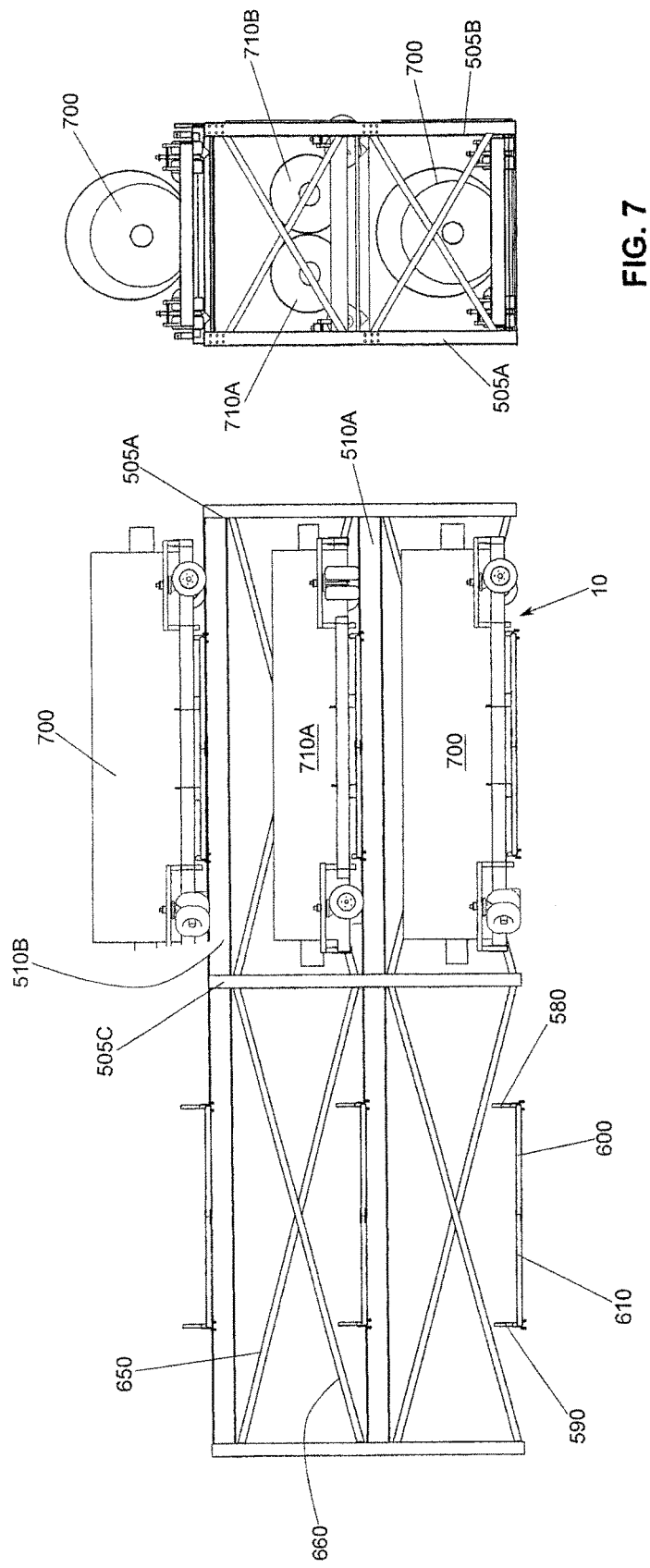

SYNTHETIC TURF STORAGE AND HANDLING SYSTEM

TECHNICAL FIELD

The present invention relates generally to the field of synthetic turf, and more particularly to a synthetic turf cart and rack storage and handling system for use in connection with arenas and field houses where turf is installed for athletic events and may be removed for storage between events.

BACKGROUND ART

Removable synthetic turf systems for arenas and field houses are known. Synthetic turf systems comprise rows of synthetic ribbons that extend vertically from a backing layer. The synthetic ribbons are designed to resemble grass and an infill layer of particulate material is often interspersed between the ribbons on the backing layer. In this arrangement, the synthetic ribbons are designed to extend a distance above the infill layer of particulate material. It is known in the prior art that the infill may comprise sand, rubber, a mixture of sand and rubber or other granulated particles such as TPE and epdm rubber. The infill of particulate material provides resiliency to the surface and helps keep the ribbons in an upright position. Generally, the ribbons and backing of artificial turf known in the prior art is formed by tufting the ribbons through one or more layers of backing. The backing may comprise a single layer of material or multiple layers of material, and the individual layers may be either woven or nonwoven material. The tufting is generally done using a conventional tufting machine, which is a giant sewing machine with hundreds of needles. Multiple ends of yarn are fed to a bank of heavy needles with a span of twelve to fifteen feet. The tufting process involves a previously constructed primary backing passing under the needles and anchoring each stitch. The ribbons are thereby stitched into the backing fabric, leaving loops which form the turf pile. The pile may be loop pile, or cut pile or a combination of cut and loop introduced simultaneously in the turf by pushing off certain loops from the hook before they are cut. Once the ribbons are tufted in place through the primary backing, the backing is further coated on its back side with a urethane or latex coating, often referred to as a secondary backing, to help adhere the stitched ribbons to the backing member and to provide dimensional stability.

BRIEF SUMMARY OF THE INVENTION

With parenthetical reference to the corresponding parts, portions or surfaces of the disclosed embodiment, merely for the purposes of illustration and not by way of limitation, a cart (10) is provided for use with one or more rolls (700, 710A, 710B) of synthetic turf in connection with a synthetic turf storage and handling system. The cart comprises a frame (13) having a first longitudinal member (16A) with a first end (19) and a second end (22) opposite the first end (19).

A second longitudinal member (16B) has a first end (29) and a second end (30) opposite the first end (29). The second longitudinal member (16B) is disposed in spaced apart relation to the first longitudinal member (16A). A first lateral member (31) extends between the first end (19) of the first longitudinal member (16A) and the first end (29) of the second longitudinal member (16B). The first lateral member (31) is disposed below the first and second longitudinal members (16A, 16B) and is connected to the first and second longitudinal members (16A, 16B) by vertical members (25, 34). The first lateral member (31) has at least one hitch ball (51) disposed thereon.

A second lateral member (48) extends between the second end (22) of the first longitudinal member (16A) and the second end (30) of the second longitudinal member (16B). The second lateral member (48) is disposed below the first and second longitudinal members (16A, 16B) and is connected to the first and second longitudinal members (16A, 16B) by vertical members (28, 120). The second lateral member (48) has at least one hitch ball (51) disposed thereon.

A plurality of lateral members (60, 63, 66, 69) are disposed between the first longitudinal member (16A) and second longitudinal member (16B) and connected thereto by a plurality of vertical members (72, 76, 79, 82, 88, 91, 97 and 100), one or more of the plurality of lateral members (60, 63, 66, 69) have an opening (85, 94) defined therein sized to receive a fork on a forklift. The plurality of lateral members (60, 63, 66, 69) are disposed in spaced apart relation from the first and second lateral members (31, 48). At least one of the plurality of lateral members (60, 63, 66, 69) have a hitch ball (86, 87) disposed thereon.

A first swivel caster (103) has at least one wheel (106A, 106B). The first swivel caster (103) is disposed near the first end (19) of the first longitudinal member (16A) between the first lateral member (31) and the plurality of lateral members (60,63, 66, 69).

A second swivel caster (115) is disposed near the first end (29) of the second longitudinal member (16B) between the first lateral member (31) and the plurality of lateral members (60, 63, 66, 69).

A third swivel caster (200) is disposed near the second end (22) of the first longitudinal member (16A) between the second lateral member (48) and the plurality of lateral members (60, 63, 66, 69).

A fourth swivel caster (210) is disposed near the second end (30) of the second longitudinal member (16B) between the second lateral member (48) and the plurality of lateral members (60, 63, 66, 69).

The first, second, third, and fourth swivel casters (103, 115, 200, and 210) are disposed inside the perimeter of the frame (13). A support member (150) is disposed in a central portion of the frame (13). The support member (150) has at least one curved surface (153A,153B) to from a cradle for receiving the one or more rolls (700, 710A, 710B) of synthetic turf.

BRIEF DESCRIPTION OF THE DRAWINGS

FIG. 3 is a top plan view of two racks shown in FIG. 2.

FIG. 4 is a front elevational view of the racks shown in FIG. 3.

FIG. 5 is a right side elevational view of the rack shown in FIG. 2.

FIG. 6 is a front elevational view of the racks shown in FIG. 4 with carts carrying synthetic turf supported thereon.

FIG. 7 is a right side elevational view of the racks and carts shown in FIG. 6.

DESCRIPTION OF THE PREFERRED EMBODIMENTS

Figure 1:
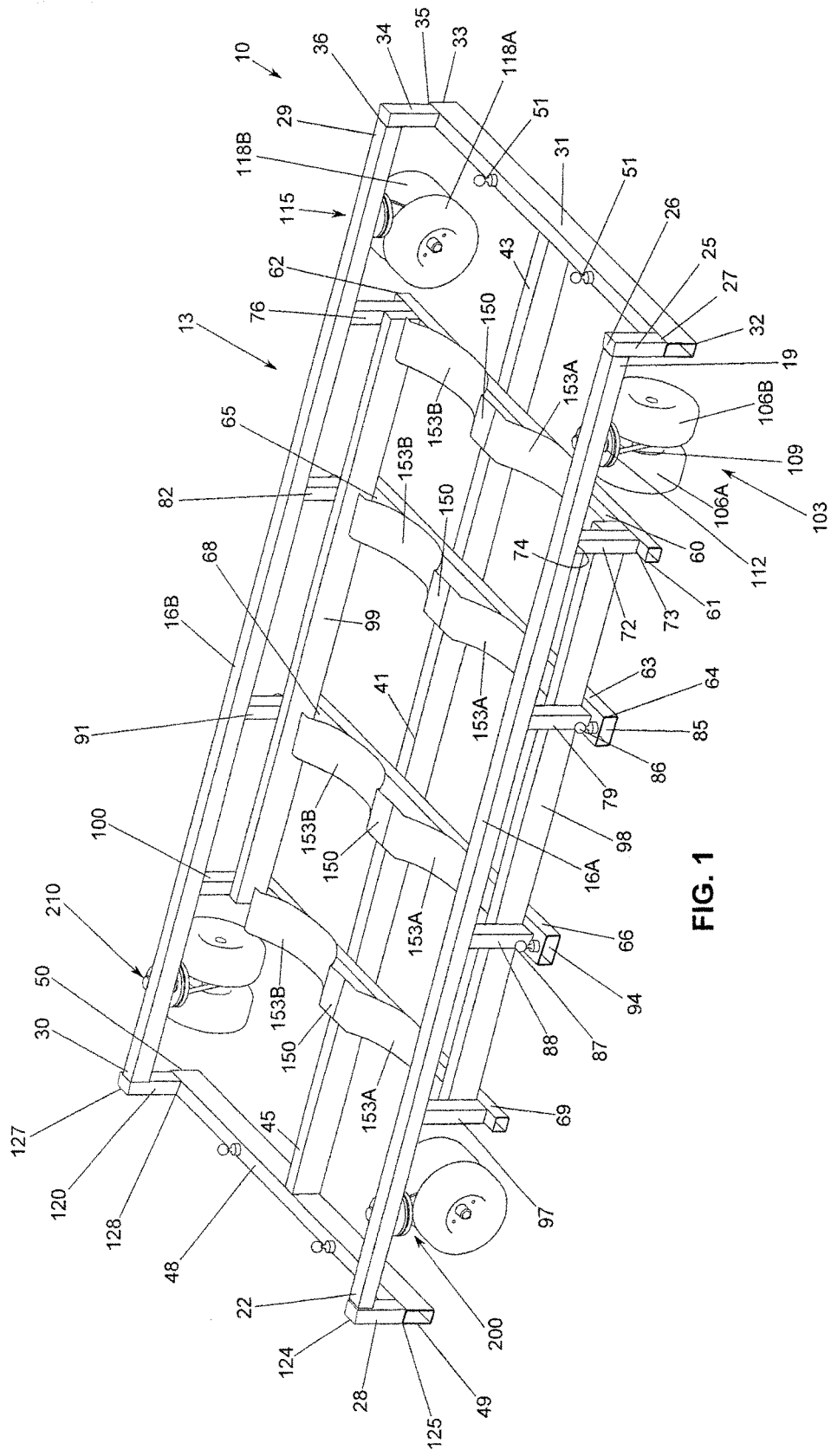
FIG. 1 is a perspective view of a cart for transport and storage of synthetic turf.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Removable synthetic turf systems are used in facilities that require a turf system that is easily removed and stored. An example of a typical facility is an arena/stadium where the installation and removal of a synthetic playing surface may be required between events being held at the arena/stadium. The arena/stadium may host numerous events including different sports requiring different playing surfaces (e.g. basketball, football, hockey, etc.) and also may host concerts, speeches, or the like between sporting events. Synthetic turf systems have been designed that utilize synthetic turf that may be stored in rolls. The playing surface may be divided into multiple sections of turf that are capable of being formed into rolls for transport and storage. For example, a portion of the playing surface may comprises several panels that may be rolled up for storage. The individual rolls formed from sections of the playing surface may be handled by a machine typically referred to as a spooler. The spooler may pay out the roll onto a support surface (either a concrete floor or a pad positioned on the floor) during installation and may wind the turf sections onto the spool during removal. Once the sections of the turf are rolled onto a spool, they may be removed from the spooler for storage. The spools containing rolled up sections of synthetic turf may be transported on a cart to a storage location. For ease of handling, the cart containing the spool of synthetic turf may be placed in a storage rack.

Synthetic turf systems generally comprise rows of synthetic ribbons that extend vertically from a backing layer. The synthetic ribbons are designed to resemble grass and an infill layer of particulate material is often interspersed between the ribbons on the backing layer. In this arrangement, the synthetic ribbons are designed to extend a distance above the infill layer of particulate material. It is known in the prior art that the infill may comprise sand, rubber, a mixture of sand and rubber or other granulated particles such as TPE and epdm rubber. The infill of particulate material provides resiliency to the surface and helps keep the ribbons in an upright position. Generally, the ribbons and backing of artificial turf known in the prior art is formed by tufting the ribbons through one or more layers of backing. The backing may comprise a single layer of material or multiple layers of material, and the individual layers may be either woven or nonwoven material. The tufting is generally done using a conventional tufting machine, which is a giant sewing machine with hundreds of needles. Multiple ends of yarn are fed to a bank of heavy needles with a span of twelve to fifteen feet. The tufting process involves a previously constructed primary backing passing under the needles and anchoring each stitch. The ribbons are thereby stitched into the backing fabric, leaving loops which form the turf pile. The pile may be loop pile, or cut pile or a combination of cut and loop introduced simultaneously in the turf by pushing off certain loops from the hook before they are cut. Once the ribbons are tufted in place through the primary backing, the backing is further coated on its back side with a urethane or latex coating, often referred to as a secondary backing, to help adhere the stitched ribbons to the backing member and to provide dimensional stability.

Referring now to FIGS. 1-7, and initially to FIG. 1 thereof, a cart 10 is provided formed by a frame 13 constructed from suitable rigid materials such as metals, including but not limited to steel or the like. The structural members may be connected or attached to one another in numerous ways as will be evident to those of ordinary skill in the art based on this disclosure. For example, the means for connecting the structural members includes, but is not limited to, fasteners such as bolts, rivets, or the like; interconnecting mechanical members on the beams and posts that connect without fasteners; or by other methods such as welding.

The frame 13 includes a pair of longitudinal members 16A and 16B. With respect to the orientation of FIG. 1, member 16A is positioned in the front and member 16B is positioned in the rear of the cart 10. Members 16A and 16B may be disposed substantially parallel to each other as shown. Member 16A has a first end 19 and a second end 22 disposed opposite from the first end 19. Member 16B has a first end 29 and a second end 30 disposed opposite from the first end 29. Member 16A is connected to vertical member 25 at the first end 19 and is connected to vertical member 28 at the second end 22. Vertical member 25 has a first end 26 and a second end 27 disposed opposite from the first end 26. The first end 26 abuts with member 16A. The second end 27 is attached to a first lateral member 31 as shown on the right hand side of the figure. The first lateral member 31 has a first end 32 and a second end 33 disposed opposite from the first end 32. The first lateral member 31 extends from the front of the frame 13 where first end 32 connects to the second end 27 of the vertical member 25 to the rear where second end 33 connects with a vertical member 34. Vertical member 34 has a first end 35 and a second end 36 disposed opposite from the first end 35. First end 35 connects to the top of the first lateral member 31. The vertical member 34 extends upward from the first lateral member 31 where second end 36 connects to the first end 29 of the longitudinal member 16B.

A longitudinal support member 41 is connected to the first lateral member 31 at a position on or near the middle of the first lateral member 31. The longitudinal support member 41 has a first end 43 and a second end 45 disposed opposite from the first end 43. The first end 43 is attached to the first lateral member 31. The second end 45 is attached to a second lateral member 48 shown at the left side of the figure.

The first lateral member 31 is provided with one or more hitch balls 51. The hitch balls 51 are provided for connecting to a trailer coupler (not shown) for using a tow vehicle (not shown) to pull and/or push the cart 10.

Moving toward the center of FIG. 1, a plurality of lateral members 60, 63, 66, and 69 are supported below longitudinal members 16A and 16B. Lateral members 60, 63, 66, and 69 are supported at or near the middle by longitudinal support member 41 which may be located underneath the lateral members to provide additional support. Lateral member 60 has a first end 61 and a second end 62 disposed opposite from the first end 61. A vertical member 72 having a first end 73 and a second end 74 is disposed between the lateral member 60 and the longitudinal member 16A. The first end 73 of the vertical member connects to the lateral member 60 at a portion disposed at or near the first end 61 of the lateral member 60. The second end 74 of the vertical member 72 is connected to the longitudinal member 16A. At the second end 62 of the lateral member 60, a vertical member 76 is disposed between the lateral member 60 and the longitudinal member 16B. Lateral member 63 is supported below longitudinal members 16A and 16B by vertical members 79 and 82. Lateral member 63 has a first end 64 and a second end 65 disposed opposite from the first end 64. Lateral member 63 may be comprised of a hollow tubular construction with an opening 85 at the first end 64. The opening 85 in the lateral member 63 is sized to receive one of the forks on a forklift for lifting the cart 10 to place it on a rack. Lateral member 63 is also provided with a hitch ball 86 for connecting to a trailer coupler (not shown) for using a tow vehicle (not shown) to pull and/or push the cart 10. Lateral member 66 is the same size and configuration as lateral member 63. Lateral member 66 has a first end 67 and a second end 68 disposed opposite from the first end 67. Lateral member 66 is supported below longitudinal members 16A and 16B by vertical members 88 and 91. Lateral member 66 is comprised of a hollow tubular construction with an opening 94 at the first end 67. The opening 94 in the lateral member 66 is also sized to receive one of the forks. Lateral member 66 is also provided with a hitch ball 87 for connecting to a trailer coupler (not shown) for using a tow vehicle (not shown) to pull and/or push the cart 10. Lateral member 69 is supported between longitudinal members 16A and 16B by vertical members 97 and 100 as described above in connection with lateral member 60.

Longitudinal supports 98 and 99 is disposed across the lateral members 60, 63, 66, and 69 at the front and rear of the frame 13 as shown. The longitudinal support members 98 and 99 may be disposed adjacent to vertical members 72, 79, 88 and 97; and 76, 82, 91, and 100, respectively. The lateral support members 60, 63, 66, and 69 provide support for a plurality of support members 150 having curved surfaces 153A and 153B providing a cradle for receiving and positioning the rolls of synthetic turf on the cart 10. The support members 150 are configured and arranged for supporting two rolls. Other configurations may also be suitable including a singled curved surface forming a cradle for supporting a single roll. The support members 150 may be covered with a perforated material to provide for drainage from the rolls of turf. A plastic/polymer sheeting may be attached to the cart 10 to keep the metal from rusting and staining the turf and primarily to keep the roll 700, 710A, 710B cradled so that it is not damaged during storage.

As shown on the right hand side of the figure, between the first lateral member 31 and lateral member 60, a first swivel caster 103 has a pair of wheels 106A and 106B. The wheels 106A and 106B are mounted on a wheel assembly 109 configured and arranged to rotate about a swivel joint 112. The first swivel caster 103 is mounted underneath and supported from longitudinal member 16A. A second swivel caster 115 having wheels 118A and 118B is also mounted on longitudinal member 16B between lateral members 31 and 60.

On the left hand side of the figure, the second lateral member 48 is supported by vertical members 28 and 120. The second lateral member 48 has a first end 49 and a second end 50 disposed opposite from the first end 49. Vertical member 28 has a first end 124 and a second end 125 disposed opposite from the first end 124. Vertical member 120 has a first end 127 and a second end 128 disposed opposite from the first end 127. The first end 124 of vertical member 28 is attached to longitudinal member 16A, and the second end 125 of vertical member 28 is connected to the first end 49 of the second lateral member 48. The first end 127 of vertical member 120 is connected to longitudinal member 16B, and the second end 128 of vertical member 120 is connected to the second end 50 of the second lateral member 48.

Also on the left side of the figure, the second end 45 of the longitudinal support member 41 is connected to the second lateral member 48. In addition a third swivel caster 200 and a fourth swivel caster 210 are provided at the second end of longitudinal member 16A and longitudinal member 16B. The swivel casters 103, 115, 200 and 210 are all disposed at a position spaced apart from the ends of the frame 13 and therefore within the overall dimensions of the frame 13.

Figure 2:
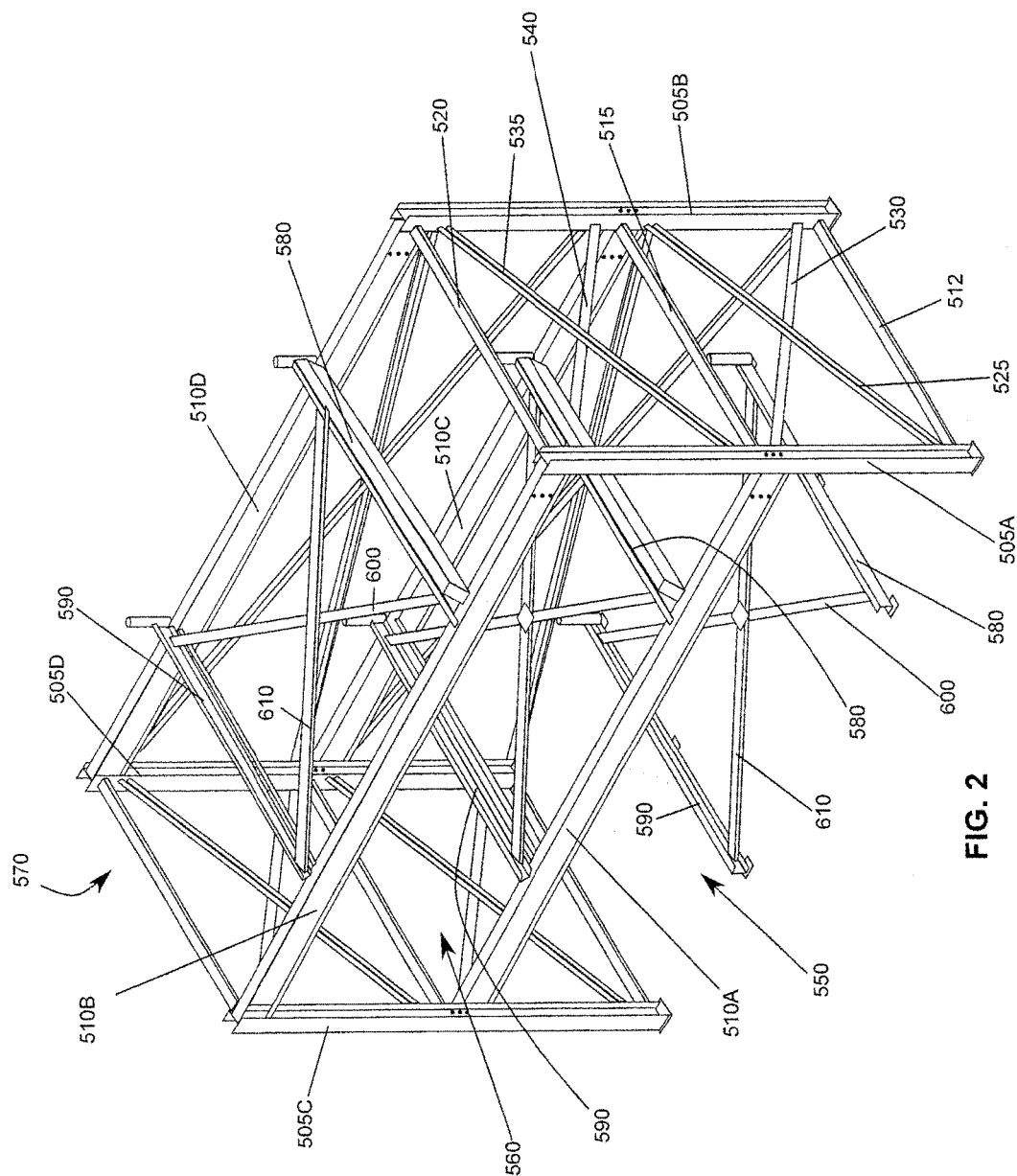
FIG. 2 is a perspective view of a rack for storing carts shown in FIG. 1 carrying synthetic turf.

Referring to FIGS. 2-5 generally, and initially to FIG. 2, a storage rack system 500 includes a system of vertical support members 505 and horizontal support members 510. The structural members are connected or attached to one another in numerous ways as will be evident to those of ordinary skill in the art based on this disclosure. For example, the means for connecting the structural members includes, but is not limited to, fasteners such as bolts, rivets, or the like; interconnecting mechanical members on the beams and posts that connect without fasteners; or by other methods such as welding. As shown on the right side of the figure, a first vertical support member 505A is disposed in spaced apart relation to a second vertical support member 505B. The vertical support members 505A and 505B are connected by a plurality of lateral support members 512, 515, and 520. Between the lateral support members 512 and 515, a pair of diagonal braces 525 and 530 are attached to the structure. Another set of diagonal braces 535 and 540 are attached to the structure between the lateral support members 515 and 520.

The horizontal support members 510A, 510B, 510C, and 510D extend from one end to the other end of the storage rack system 500. The left hand side of the rack system 500 is constructed as described above in connection with the right hand side. Accordingly, vertical support members 505C and 505D are provided with lateral support members and diagonal braces and are connected to the horizontal support members 510A-510D. The structure shown forms three spaces for receiving carts 10. The first space 550 is bordered by the floor at the bottom. The second space 560 is bordered by the horizontal support members 510A-D and by the vertical support members 505A-D. Finally, a third space 570 is provided at the top of the rack system 500.

As shown in the middle of the figure, a pair of upstanding members 580 and 590 are disposed in spaced apart relation. The upstanding members 580 and 590 are substantially parallel to each other and are spaced apart from the ends of the rack system 500. The upstanding members 580 and 590 may be connected by diagonal support members 600 and 610 to provide for additional structural support. The upstanding members 580 and 590 are designed to engage with portions of the frame 13 of the carts 10 such that the carts 10 can be placed onto the rack system 500 with a forklift (not shown), and the cart 10 is not supported by the wheels on the swivel casters during storage so it will not roll.

As best shown in FIG. 4, additional diagonal support braces 650 and 660 are connected between opposite vertical members 505B and 505D at the back of each shelf of the rack system 500 to provide additional structural support.

Turning to FIG. 6, a plurality of carts 10 may either be rolled into the rack system 500 (bottom opening 550) or lifted and placed on the rack system 500 by a forklift. The carts 10 may support synthetic turf in a single roll 700 or in a pair of smaller rolls 710A and 710B. The cart 10 rests on the upstanding members 580 and 590 so that the wheels on the swivel casters do not engage with the rack system 500. As best shown in FIG. 7, the carts 10 are configured and arranged to provide support for the single roll 700 or the pair of rolls 710A and 710B.

The present invention contemplates that many changes and modifications may be made. Therefore, while the presently-preferred form of the synthetic turf storage and handling system has been shown and described, and several modifications and alternatives discussed, persons skilled in this art will readily appreciate that various additional changes and modifications may be made without departing from the scope of the invention.

The invention claimed is:

1. A cart for use with one or more rolls of synthetic turf in connection with a synthetic turf storage and handling system, the cart comprising:
   a support member having at least one curved surface to form a cradle for receiving the one or more rolls of synthetic turf
   a first longitudinal member having a first end and a second end opposite the first end;
   a second longitudinal member having a first end and a second end opposite the first end, the second longitudinal member disposed in spaced apart relation to the first longitudinal member;
   a first lateral member extending between the first end of the first longitudinal member and the first end of the second longitudinal member, the first lateral member disposed below the first and second longitudinal members and connected to the first and second longitudinal members by first and second vertical members, the first lateral member having at least one hitch ball disposed thereon;
   a second lateral member extending between the second end of the first longitudinal member and the second end of the second longitudinal member, the second lateral member disposed below the first and second longitudinal members and connected to the first and second longitudinal members by first and second vertical members, the second lateral member having at least one hitch ball disposed thereon;
   a plurality of lateral members disposed between the first longitudinal member and second longitudinal member and connected thereto by a plurality of vertical members, one or more of the plurality of lateral members having an opening defined therein sized to receive a fork on a forklift, the plurality of lateral members disposed in spaced apart relation from the first and second lateral members, at least one of the plurality of lateral members having a hitch ball disposed thereon;
   a first swivel caster having at least one wheel, the first swivel caster disposed near the first end of the first longitudinal member between the first lateral member and the plurality of lateral members;
   a second swivel caster disposed near the first end of the second longitudinal member between the first lateral member and the plurality of lateral members;
   a third swivel caster disposed near the second end of the first longitudinal member between the second lateral member and the plurality of lateral members;
   a fourth swivel caster disposed near the second end of the second longitudinal member between the second lateral member and the plurality of lateral members; and
   the first, second, third, and fourth swivel casters disposed inside a perimeter defined by the first longitudinal member, the second longitudinal member, the first lateral member and the second lateral member.

2. The cart set forth in claim 1, and further comprising a rack comprising at least two upstanding members configured and arranged to engage the cart and support the cart such that the wheels on the swivel casters are suspended.

3. A cart for use with one or more rolls of synthetic turf in connection with a synthetic turf storage and handling system, the cart comprising:
   a support member having at least one curved surface to form a cradle for receiving one or more rolls of synthetic turf;
   a first longitudinal member;
   a second longitudinal member disposed in spaced apart relation to the first longitudinal member;
   a plurality of lateral members disposed in spaced apart relation to each other and extending between the first longitudinal member and the second longitudinal member; and
   one or more of the plurality of lateral members having an opening defined therein sized to receive a fork of a forklift.

4. The cart set forth in claim 3, wherein the plurality of lateral members are connected to the first longitudinal member and the second longitudinal member by a plurality of vertical members.

5. The cart set forth in claim 3, wherein one or more of the plurality of lateral members comprises a hitch ball disposed thereon.

6. The cart set forth in claim 3, and further comprising a rack supporting the cart.

7. A cart for use with one or more rolls of synthetic turf in connection with a synthetic turf storage and handling system, the cart comprising:
   a support member having at least one curved surface to form a cradle for receiving one or more rolls of synthetic turf;
   a first longitudinal member having a first end and a second end opposite the first end;
   a second longitudinal member having a first end and a second end opposite the first end, the second longitudinal member disposed in spaced apart relation to the first longitudinal member;
   a first lateral member extending between the first end of the first longitudinal member and the first end of the second longitudinal member, the first lateral member disposed below the first and second longitudinal members and connected to the first and second longitudinal members by first and second vertical members, the first lateral member having at least one hitch ball disposed thereon; and
   a second lateral member extending between the second end of the first longitudinal member and the second end of the second longitudinal member, the second lateral member disposed below the first and second longitudinal members and connected to the first and second longitudinal members by first and second vertical members, the second lateral member having at least one hitch ball disposed thereon.

8. A cart for use with one or more rolls of synthetic turf in connection with a synthetic turf storage and handling system, the cart comprising:
   a support member having at least one curved surface to form a cradle for receiving one or more rolls of synthetic turf;

a first longitudinal member having a first end and a second end opposite the first end;

a second longitudinal member having a first end and a second end opposite the first end, the second longitudinal member disposed in spaced apart relation to the first longitudinal member;

a first lateral member extending between the first end of the first longitudinal member and the first end of the second longitudinal member;

a second lateral member extending between the second end of the first longitudinal member and the second end of the second longitudinal member;

a plurality of lateral members disposed between the first longitudinal member and second longitudinal member;

the plurality of lateral members disposed in spaced apart relation from the first and second lateral members, at least one of the plurality of lateral members;

a first swivel caster having at least one wheel, the first swivel caster disposed near the first end of the first longitudinal member between the first lateral member and the plurality of lateral members;

a second swivel caster disposed near the first end of the second longitudinal member between the first lateral member and the plurality of lateral members;

a third swivel caster disposed near the second end of the first longitudinal member between the second lateral member and the plurality of lateral members;

a fourth swivel caster disposed near the second end of the second longitudinal member between the second lateral member and the plurality of lateral members;

the first, second, third, and fourth swivel casters disposed inside a perimeter defined by the first longitudinal member, the second longitudinal member, the first lateral member and the second lateral member; and a rack comprising at least two upstanding members configured and arranged to engage the cart and support the cart such that the wheels on the swivel casters are suspended.

* * * * *